United States Patent
Lamartine et al.

[11] Patent Number: 6,136,071
[45] Date of Patent: Oct. 24, 2000

[54] PROCESS FOR THE RECOVERY OF VOLATILE LOW MOLECULAR COMPOUNDS

[75] Inventors: Roger Lamartine, Villeurbanne, France; Philippe Choquard, Cologny, Switzerland; Philippe Goreloff; Yvon Martelin, both of St. Maurice de Beynost, France

[73] Assignee: Transdiffusia S.A., Switzerland

[21] Appl. No.: 09/140,929

[22] Filed: Aug. 27, 1998

Related U.S. Application Data

[63] Continuation-in-part of application No. PCT/IB97/00162, Feb. 25, 1997.

[51] Int. Cl.[7] .............................. B01D 53/04; B01D 53/14
[52] U.S. Cl. .............................. 95/128; 95/135; 95/136; 95/141; 95/232; 95/235; 95/237
[58] Field of Search .............................. 95/116, 118, 135, 95/136, 141, 230, 232, 235, 237; 423/227, 230, 237, 238, 239.1, 242.7, 245.1, 245.2

[56] References Cited

U.S. PATENT DOCUMENTS 3,607,047   9/1971   Broom et al. .......................... 95/232 X

FOREIGN PATENT DOCUMENTS

| 54-016368 | 2/1979 | Japan ........................................ 95/128 |
| 2292156A | 2/1996 | United Kingdom . |
| WO89/08092 | 9/1989 | WIPO . |
| WO94/04483 | 3/1994 | WIPO . |
| WO95/11449 | 4/1995 | WIPO . |
| WO95/11208 | 4/1998 | WIPO . |

OTHER PUBLICATIONS

XP 002016916 Derwent; Patent Abstracts of Japan; Publication No. JP2124850; Ito Osamu; Publication Date May 14, 1990; 3 pages.

Derwent; Patent Abstracts of Japan; Publication No. JP3249941; Tanaka Mochihiro; Publication Date Nov. 11, 1991; 2 pages.

*Primary Examiner*—Robert H. Spitzer
*Attorney, Agent, or Firm*—Ostrolenk, Faber, Gerb & Soffen, LLP

[57] ABSTRACT

A process for recovering volatile, generally bad smelling low molecular, low polar substances called VLC, contained in gas streams, by capturing the same by in contacting the gaseous environment with a calixarene or a resorcinol calixarene present in the form of particles, granules, as a coating or impregnation on or in a solid support, or as an organic or aqueous solution.

13 Claims, 2 Drawing Sheets

PROCESS FOR THE RECOVERY OF VOLATILE LOW MOLECULAR COMPOUNDS

CROSS-REFERENCE TO RELATED APPLICATIONS

This is a continuation-in-part of International Application PCT/IB97/00162, with an International filing date of Feb. 25, 1997.

BACKGROUND OF THE INVENTION

1. Field of the Invention

The present invention belongs to the technical field of gas phase absorption. More specifically, the invention refers to a process for the removal or recovery of gaseous, volatile organic or inorganic low molecular, low polar compounds, called "VLC" in this technical field, from gaseous environments such as gas streams, typically air streams.

In the modern society, the environment suffers from various VLC sources. Industrial gaseous emissions greatly contribute to the pollution of the atmospheric environment. Human activities linked to that pollution are the following: energy production, wood and paper industries, paints and polymers, agro-alimentary industries such as gist and sugar manufacture, the petrochemical industry, etc. The olfactive nuisances generated by wastes (industry of animal by-products, animal excrements, household garbage) will add to this pollution. Furthermore, sewage purification plants are sources of bad smells.

There is a still growing interest to treat the nuisances generated by the industrial world, and especially the elimination of bad odors has considerably increased during the last years in following the general requirements of a better quality of life.

There are already technical solutions available and corresponding necessary regulations set out regarding the partial or complete removal of odors. Thus, in France, Section 17 of the decree No. 77 of Sep. 12, 1972, states that "the regulations consider in particular, on one hand, the effectiveness of available techniques and their economy and, on the other hand, the quality of the vocation and the use of environmental mediums". The regulation emerging from the laws and the decrees thus comprises the necessary tools for an adaptation to the evolution of antipollution techniques and their application.

2. Description of the Prior Art

Different deodorizing techniques are already known: odor masking, thermal oxidation with and without catalysts, active carbon adsorption, biological purification, gas-solid absorption combined with chemical washing, etc. Therefore, the treatment of odors is generally effected by washing and oxidation, by adsorption (on charcoal, natural adsorbents, synthetic adsorbents), or by biopurification.

Japanese Patent Publication No. JP-3,249,941 (application No. JP-90-0'046'450) discloses a deodorant composition for garbage and toilets comprising the reaction product of a divalent heavy metal salt such as $CuCl_2$ and ascorbic or erythorbic acid in aqueous, isopropanol containing ammonia at 70° C. for 4 hours. The reaction product is formed or deposited in powdered p-tert-butylcalix[8]arene as a support. Tests, published in this document, have shown that the deodorizing effect of said reaction product is the same with and without calixarene which acts thus as a solid support or carrier only and not as a deodorizing agent.

The document WO-A-89.08092 discloses the removal of polar hydrocarbons such as trihalomethanes from fluids, in particular from drinking water.

The ability of calixarenes for absorbing non-polar, relatively low molecular substances has already become known. Thus, the following documents disclose this finding: U.K. Patent No. 2,292,156 (separation of alkanes from a hydrocarbon mixture, using an aqueous solution of a calixarene); and WO 95 11,208 (liquid phase separation of alkenes and aromatics from a hydrocarbon stream).

Finally, the international patent publication No. WO 95/11449 discloses the use of calixarenes which are substituted by at least one redox active substituent for the detection of toxic agents such as chemical warfare agents. Another publication (JP-A-02,124,850) describes the polymerization and the use of vinyl substituted calixarenes.

Taking into account the sometimes very high volatility of the odorous VLC and the very low olfactive perception level of most of these compounds, no method and technique whatsoever affords a satisfactory solution of the problem. The industrial, continuous absorption of gaseous, bad smelling sulfur or nitrogen containing compounds from a gas stream in using pure calixarenes which are not substituted by reactive groups is neither disclosed nor suggested in the prior art.

SUMMARY OF THE INVENTION

The first and major objective of the present invention is to overcome the drawbacks of the solutions suggested until now and to provide a new and useful purification method, more precisely a process for the recovery and removal of VLC contained in a gas stream, which uses a new class of solid capturing materials.

A further object of the present invention is to develop a method for the purification of gas streams, for example such emitted by water purification plants, which are contaminated with bad smelling, low polar, light-weight gaseous components containing nitrogen or sulfur such as ammonia, hydrogen sulfides, amines, thiols and disulfides.

Still another object of this invention is to provide a new adsorbing or, more precisely, capturing material in which the adsorption process is based on another principle than that of the process used until now.

A further objective of this invention is to provide such an absorbing or capturing material which can easily be regenerated in a simple, low-cost manner.

The process of the invention comprises contacting a gas stream that contains VLC, with cyclic phenolic oligomers deposited on a particulate carrier or dissolved or dispersed in a washing liquid. The adsorbent of the invention contains, as an active constituent, cyclic phenolic oligomers.

The following listing gives examples of bad smelling organic and inorganic compounds of low polar nature and having generally a low molecular weight that are preferably intended to be removed from a gas stream by the process and the absorbent of the present invention: ammonia, lower alkyl amines such as mono, di and trimethyl amine, mono, di and triethyl amine; and sulfur containing compounds such as hydrogen sulfide, lower organic thiols (mercaptans) such as methanethiol, ethanethiol, propanethiol, and sulfides such as dimethylsulfide and diethylsulfide. This listing is not exhaustive.

All the compounds listed above have dipole polarizabilities (in units of $10^{-24}$ $cm^3$) of from about 2.25 (ammonia) to 4.7 (methylamine) whereas the polarizabilities of the trihalomethanes described in the above cited PCT application No. WO-A-89.08092 range from 4.75 (chloroform) to 18.0 (triiodomethane). Low molecular hydrocarbons as mentioned in the above cited U.K. patent have no or only very low dipole polarizabilities.

These cyclic phenolic oligomers mentioned above that are used in the present invention are called "calixarenes"; they form a class of chemical compounds corresponding to the following structural formula I:

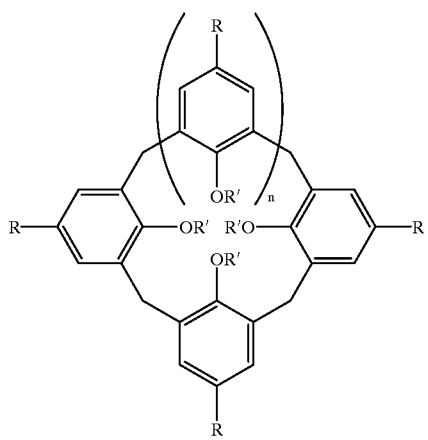

(I)

wherein n is an integer from 1 to 7,

R is hydrogen, a hydrocarbon radical, hydroxy, amino, carboxyl (—COOH), sulfoxyl (—SO$_3$H) or a halogen, or a halogen, nitrogen, sulfur or phosphorus containing radical, and R' has one of the meanings defined for R in being identical to R or different from R, and R' may further be a radical —Si(CH$_3$)$_3$.

Such compounds of formula (I) are preferred wherein R is hydrogen, alkyl, substituted alkyl, allyl, aryl, substituted aryl, hydroxy, amino, carboxy, sulfo; R' is hydrogen, alkyl, substituted alkyl, allyl, aryl, substituted aryl, acyl such as acetyl, or —Si(CH$_3$)$_3$, and n is an integer from 1 to 5 included.

Still further preferred are calixarenes that correspond to formula (I) above wherein n=1, 3 or 5 and R' is hydrogen, and particularly preferred are p-tert-butyl calixarenes. Particularly preferred is the use of mixtures of calixarenes having a different number of ring members when the gaseous environment contains simultaneously amines and sulfur compounds. In fact, it has been found that amines are preferably adsorbed by calix[8]arenes whereas sulfur containing compounds such as H$_2$S and thiols are only weakly absorbed by these compounds but effectively captured by calix[4] and calix[6]arenes.

The above mentioned calixarenes are already known compounds and may be obtained by simple reactions, generally one-pot reactions, starting from a corresponding p-substituted phenol wherein the two ortho positions of the phenolic hydroxy group are free, and formaldehyde. The reactions are generally effected in the presence of a suitable catalyst, known per se. If, in formula (I), R and/or R' are hydrogen, the produced calixarenes should be submitted to a desalkylation or, respectively, desarylation reaction.

The following resorcinol calixarenes of formulae (II) and (III) can also be used instead of or together with the calixarenes defined above:

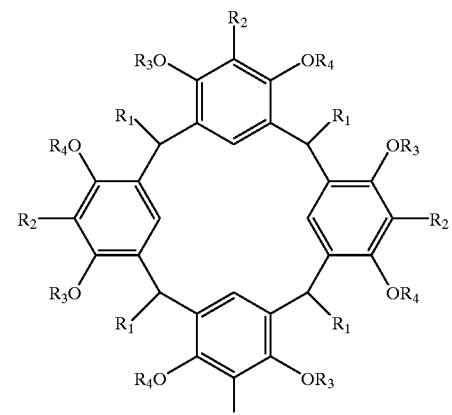

(II)

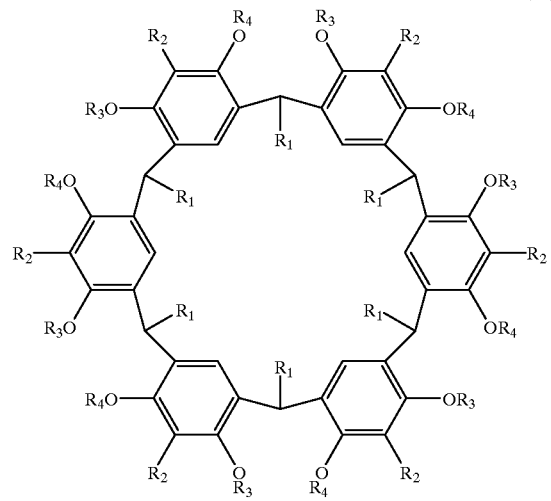

(III)

wherein R$_1$, R$_2$, R$_3$ and R$_4$ are independently hydrogen or an organic radical.

It is preferred to use resorcinol calixarenes of formula II wherein R$_1$ is alkyl or aryl, or substituted alkyl or aryl, R$_2$, R$_3$ and R$_4$ are hydrogen, and n is 1. These re-sorcinol calixarenes are particularly useful for capturing nitrogen containing compounds such as ammonia and amines. In the practice of the present invention, C-benzyl-resorcinol calixarenes are preferably used.

These macrocyclic compounds which are solid at normal temperature, can be obtained by one-shot, low cost reactions, for example by a condensation reaction starting from an alcoholic resorcinol solution and an equivalent of an aldehyde R$_1$-CHO in an acidic medium. Regarding the details of the preparation and isolation of calixarenes and resorcinol calixarenes, see, e.g., Gutsche et al., Org. Syn. 1989, 68, 234; Niederl and Vogel, Ber. 1940, 62, 2512; and Hogberg, J. Amer. Chem. Soc. 1980, 102, 6046.

In the practice of the present invention, "odd" calixarenes (odd number of rings in the molecule) may also be used as well as the normally available "even" ones. As to resorcinol calixarenes, C-benzylresorcinol calixarenes are preferred.

BRIEF DESCRIPTION OF THE DRAWING

In the attached drawing.

DETAILED DESCRIPTION OF THE INVENTION

Figure 1:
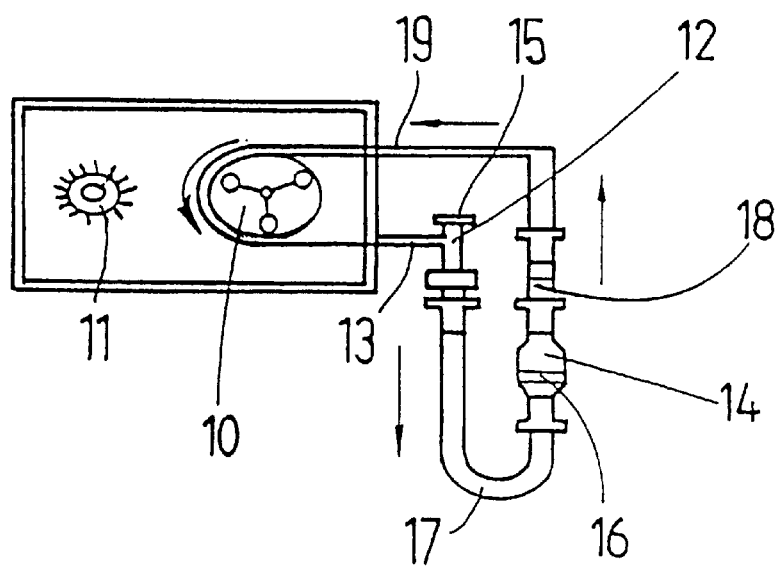
FIG. 1 is a schematic view of an apparatus for determining the effectiveness of the process.

It has now been found in a surprising manner that the above described macromolecules are capable of selectively capture odorous VLC's such as ammonia, light weight amines, sulfur containing VLC's, etc., such as listed above, from a gas stream that contains these VLC's when the latter is contacted or treated with the calixarenes and/or resorcinol calixarenes described above. According to the invention, a gas stream which contains VLC's is passed through a bed containing the mentioned macrocyclic material or materials, deposited on a solid, particulate carrier. It appears that the retention of the VLC's does not preferentially occur by physical adsorption but by a capturing complexation mechanism. For example, when a low molecular amine or a thiol (mercaptan)is dissolved together with a calixarene or resorcinol calixarene of the above formulae, well defined supramolecular species are obtained which are sometimes even crystallized and present the following molar ratios between VLC and calixarene:

| VLC | 4 | 6 | 8 | 4H | CER | CBR |
|---|---|---|---|---|---|---|
| MA | 1 | 2.4 | 3.3 | 1 | 0.97 | 0.8 |
| DM | 1 | 2.2 | 2.6 | 1.7 | 1.1 to 2.4 | 2.3 to 4.3 |
| TM |  |  |  | 1.7 |  | 0.4 |
| EA | 1 | 3.2 | 6.3 | 1 | 2.4 | 1.1 |
| DE | 2.6 | 2.2 | 4.8 | 1.2 | 3.6 | 6.1 |
| TE |  |  |  |  | 2.1 | 2.4 to 4.3 |

In this Table, the following abbreviations have been used:
Head:
  4: p-tert-butylcalix[4]arene
  6: p-tert-butylcalix[6]arene
  8: p-tert-butylcalix[8]arene
  4H: calix[4]arene
  CER: C-ethyl resorcinolcalixarene (n=1)
  CBR: C-benzyl calixarene (n=1);
Left-hand column:
  MA: methylamine
  DM: dimethylamine
  TM: trimethylamine
  EA: ethylamine
  DE: diethylamine
  TE: triethylamine.

The behavior of the mentioned calixarenes, when brought into contact with a gaseous medium, may be considered as a reference for any use in the practice of the present invention, namely in a process for the deodorizing of gaseous media by complexing capture.

In the practice of the invention, the calixarenes are used in the form of a generally thin layer deposit on the surface of a solid, particulate support or carrier or in the form of granules as it is the current use in gas absorption techniques. The carrier may be porous or not; for example silica, alumina, active coal or charcoal (where there is often a synergistic effect by combined physical adsorption and capture to be observed), sand, gravel, cellulose, synthetic resins such as polystyrene, etc. The one skilled in the art will immediately know and find the support the best adapted to a certain task. It is possible to prepare a solution of the calixarenes and resorcinol calixarenes to be used in an organic solvent and to coat or impregnate the support with this solution, and the material which is finally obtained by drying is ready for use. Generally, relatively very thin layers of the selected calixarene on the solid, particulate support will be preferred since such thin layers enhance the speed of both adsorption and desorption.

The calixarene compounds to be used in the process of the present invention can generally be employed in the form they come from synthesis; it is normally not necessary to purify them in any way. Of course, if these compounds contain impurities stemming from their preparation, their activity as capturing agents will be less than the 100% pure compounds; this is merely a question of economy whether they will be purified and to which extent.

In order to purify a gas stream containing the VLC's, it will be sufficient to pass the stream through a bed having appropriate dimensions, of the calixarene particles or the particles containing same, as it has been indicated above. Typically, the gas stream is air contaminated by one or more VLC's. It is not required to treat the gas stream in any manner whatsoever; in particular, the gas stream need not be dried, heated or cooled before. When the use is intended for deodorizing the gases coming from a water purification plant, these exhaust gases are pushed by a fan through a column that contains a layer or a bed of a particulate support impregnated with calixarenes. However, it will also be possible to wash said VLC containing gas stream in contacting this gas mixture with a homogeneous or heterogeneous liquid such as a solution or a dispersion of the calixarenes or the resorcinol calixarenes concerned. The absorption technique of a gaseous component from a gas mixture by washing is in principle known; typically, a vertical column is used in which the gas stream flows from the bottom to the top, and a liquid current in finely divided form flows countercurrently down from the top to the bottom. Of course, any washing installation whatsoever may be used such as bubble tray columns, sieve tray columns, packed columns, etc.

Typically, the process of the present invention, namely the capture of VLC's from a gas stream, is carried out at ambient temperature and pressure. However, if other gas parameters are pre-established, such as elevated pressure and/or temperature, these conditions do normally not require any adaptation, i.e. their reduction to ambient conditions.

Reconditioning

It has surprisingly been found that, in spite of their polar nature, the captured VLC's can easily be separated from the capturing material. This fact allows to regenerate the absorbing material for repeated uses and has only been reported in the prior art for the case of non-polar captured compounds.

The interactions between the VLC's, called "substrate" in the following explanation paragraphs, and the calixarenes or resorcinol calixarenes occur in heterogeneous media, most frequently at a solid/gas (or sometimes liquid/gas) interface in the described cases. The solid phase having captured and fixed the substrate may easily be recovered. Different methods may be used to separate the substrate from the solids loaded with the substrate and to recycle the recovered solids. All these methods are based upon the principle to offer to the substrates stronger bindings than those effected by the calixarenes and the resorcinol calixarenes.

Regarding the nitrogen containing substrates, the treatment of the solids having captured the substrates in a heterogeneous mixture of water and calixarenes allows to extract the amines into the water; in order to speed up the dissociation of the amines from the calixarenes, the water temperature may be increased, acids may be added to the water, and/or ultrasonics may be applied.

Sulfur containing substrates such as hydrogen sulfide and thiols or disulfides are only slightly soluble in water and highly volatile. It is therefore suggested to transform the sulfur containing substrates in non volatile metallic sulfides. In the case of hydrogen sulfide, the solids containing this substrate may be treated with a metal salt solution, for example zinc acetate solution. The hydrogen sulfide is thus transformed into zinc sulfide which is insoluble and heavy-weighted. After filtration and drying the precipitate, the weight of the ZnS may be determined. This recycling method thus allows at the same time to quantitatively analyze the captured $H_2S$:

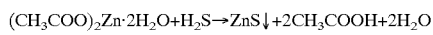

$(CH_3COO)_2Zn \cdot 2H_2O + H_2S \rightarrow ZnS\downarrow + 2CH_3COOH + 2H_2O$ Finally, regarding the thiols or disulfides, the treatment of the solids having captured the substrates with an aqueous solution of a heavy metal salt, for example copper acetate, is able to isolate the thiols or disulfides in the form of insoluble metal sulfides. However, electro-chemical methods using silver electrodes may also be used, or the thiols or disulfides may be transformed to metal sulfides by means of an aqueous silver nitrate solution, or they may be oxidized into disulfides, e.g. by potassium ferricyanide.

The following Examples are given for illustrating purposes only and will not limit the invention in any way.

EXAMPLE 1

An air stream that contains diethylamine is treated in the installation shown in FIG. 1 which schematically represents a system for the treatment of a gas flow. A peristaltic pump 10, driven by an adjustable electric motor 11 and connected through a conduit 13 to an injection device 12 having a skirt seal 15 for inserting an injection needle. The injection device 12 is connected by a conduit 17 to a tubular reactor 14 containing the calixarene or resorcinol calixarene, respectively, to be tested, enclosed between two frits 16 and 18. The circuit is closed by another conduit 19 leading from the reactor 14 to the peristaltic pump 10.

In the reactor 14, 159 mg of C-benzyl-resorcinol calixarene are placed. The pump 10 is put on, and $9.66 \cdot 10^{-5}$ moles of diethylamine are injected through the seal 15 into the system which totals a volume of 160 ml so that the air within the system contains about 1450 ppm of diethylamine. The pump 10 is adjusted to a flow rate of 300 ml/min. Samples are taken in predetermined time intervals and quantitatively analyzed by gas chromatography according to the method of an inner n-pentane standard. This measuring method permits to follow the evolution of the gas flow regarding the concentration in function of time. Blind tests are also carried out for testing the validity of the method.

Figure 2:
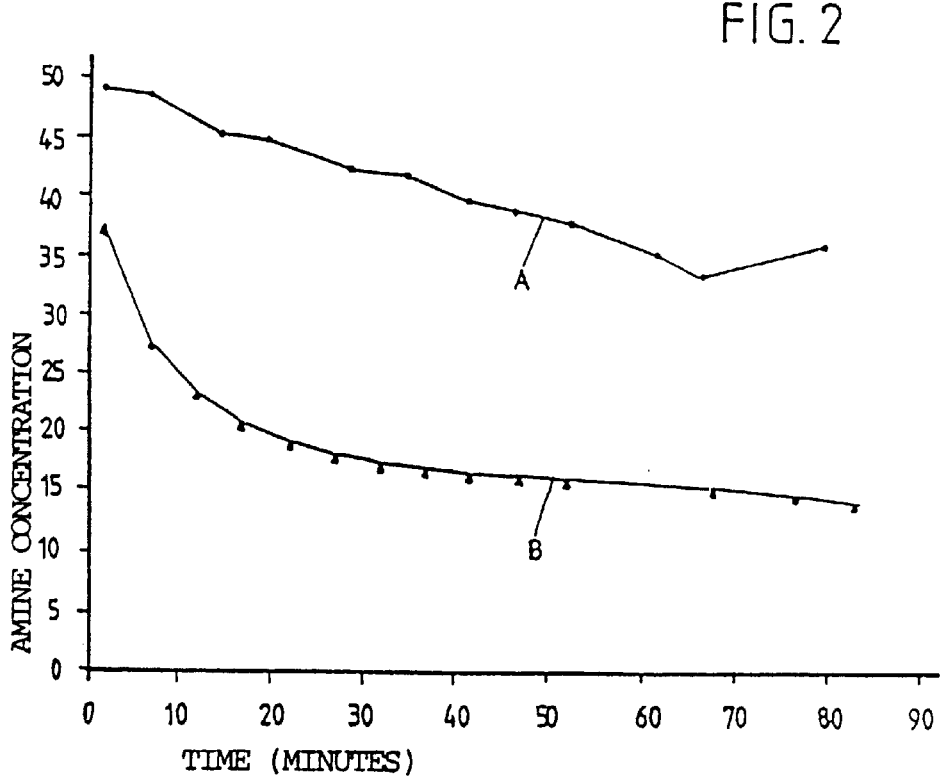
FIG. 2 represents in diagram form the results of a test according to Example 1.

FIG. 2 shows the results that have been obtained in diagram form. The amine content, given in arbitrary units, is plotted on the abscissa against the test time in minutes on the ordinate. After 85 minutes, the amine concentration in the blind test (curve A) has dropped from 48 to 36 units (decrease by 25%) whereas, when calixarene was used in the reactor (curve B), 50% of the amine were already captured and removed from the circuit after 20 minutes (from 1450 to 700 ppm). The degree of capture is 62% after 85 minutes. The diagram further shows that there is no liberation of amine during the test from the capture system.

EXAMPLE 2

An air stream that contains methylamine is treated in the installation of FIG. 1.

47 mg of C-benzylresorcinol calixarene are. placed in the reactor 14. The pump 10 is put on, and $5.81 \cdot 10^{-5}$ moles of methylamine are injected into the device 12. The system contains thus about 8700 ppm of methylamine. The pump 10 is adjusted and controlled to a flow rate of 300 ml/min. Samples are taken in regular time intervals and analyzed by vapor phase chromatography against an internal standard. Blind tests are conducted in order to test the reliability of the method.

Figure 3:
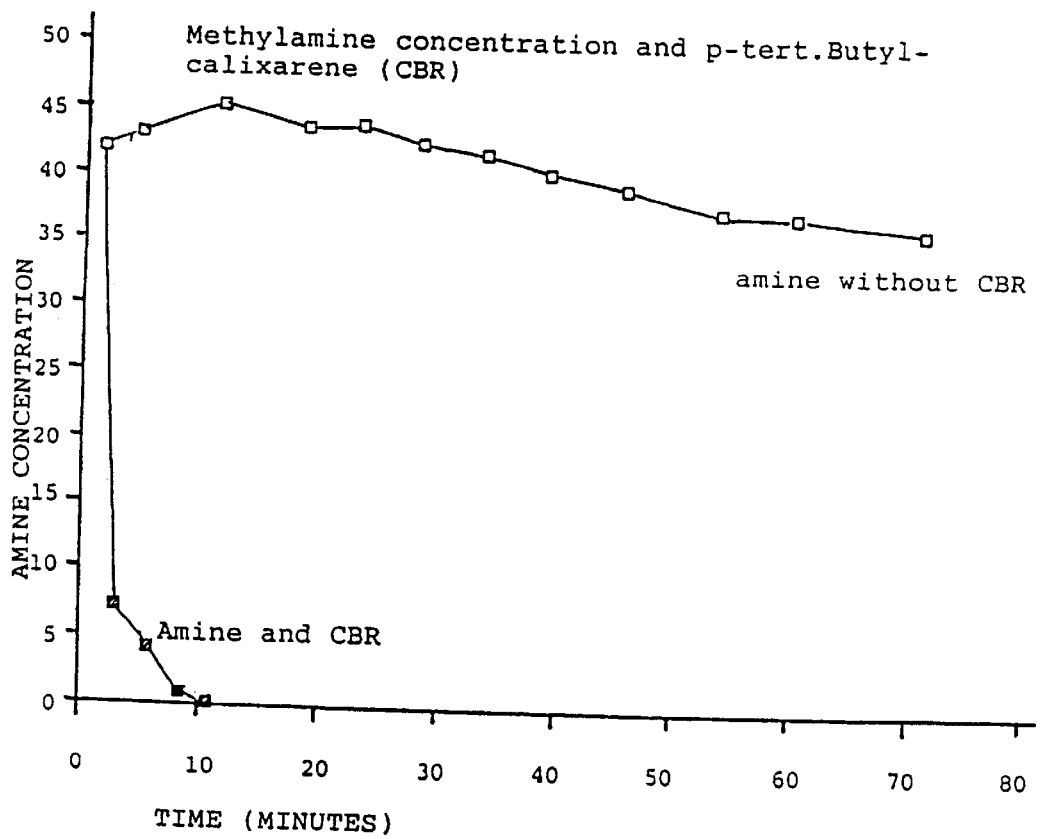
FIG. 3 represents in diagram form the results of a test according to Example 2.

FIG. 3 shows the results that have been obtained. After 5 minutes, the concentration of the amine in the blind test is about 40 units whereas, when the calixarene is used, 90% of the amine have been captured and removed from the circuit in passing from 8700 to 830 ppm. The degree of capture is 100% after 10 minutes. The diagram shows that there is no subsequent liberation of amine in the capture system.

EXAMPLE 3

An air stream that is saturated with hydrogen sulfide is treated in the installation shown in FIG. 1.

140 mg of p-tert-Butylcalix[4]arene are placed in the reactor, and the air of the reactor is then saturated with $H_2S$. After having conducted the circulation as described above in Example 1, the atmosphere of the reactor is washed with some air free from $H_2S$.

The calixarene loaded with $H_2S$ is collected and transferred into a solution of zinc acetate and mixed thoroughly. A white precipitate of ZnS is formed. The reaction medium is filtered, and the residue is treated with an appropriate organic solvent for dissolving and extracting the calixarene. The ZnS residue is then filtered and dried, giving 19.6 mg of ZnS which corresponds to the capturing of 1 molecule of $H_2S$ per molecule of calixarene.

If other calixarenes are used, the results are different. For example, when the p-tert-butylcalix[4]arene is substituted by p-isopropylcalix[4]arene, ½ molecule of $H_2S$ per molecule of calixarene is found, and p-allylcalix-[4]arene shows a capturing capacity of 2 molecules of $H_2S$ per molecule of calixarene.

The process of the invention can further be used for keeping clean and odorless the environment in the household, in restaurants, etc.; examples are refrigerators, filters in air conditioners, in hoods for kitchen stoves, etc.

What is claimed is:

1. A process for the capture of volatile compounds contained in a gaseous environment wherein the gaseous environment is contacted with a calixarene, the process comprising contacting said gaseous environment containing at least one low molecular component (VLC) having a dipole polarizability of from about $2.25 * 10^{-24}$ cm$^3$ to about $4.7 * 10^{-24}$ cm$^3$ with (a) at least one, calixarene of the formula I:

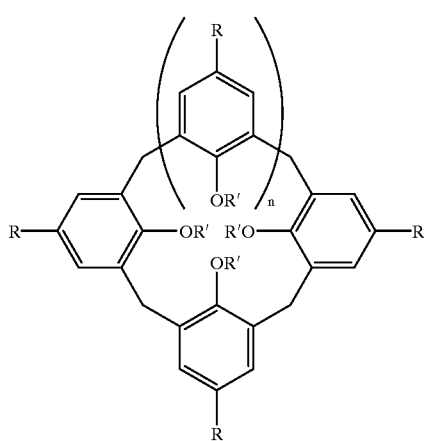

(I)

wherein n is an integer from 1 to 7,

R is hydrogen, a hydrocarbon radical, hydroxy, amino, carboxy (—COOH), sulfo (—SO$_3$H) or halogen, a halogen containing radical, or a nitrogen, sulfur or phosphorus containing radical, and R' independently has one of the meanings defined for R or is —Si(CH$_3$)$_3$, or (b) at least one resorcinol calixarene of formulae II or III:

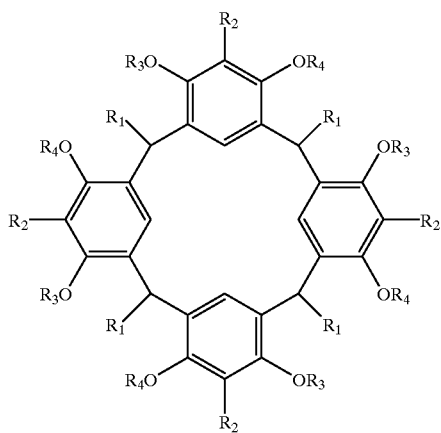

(II)

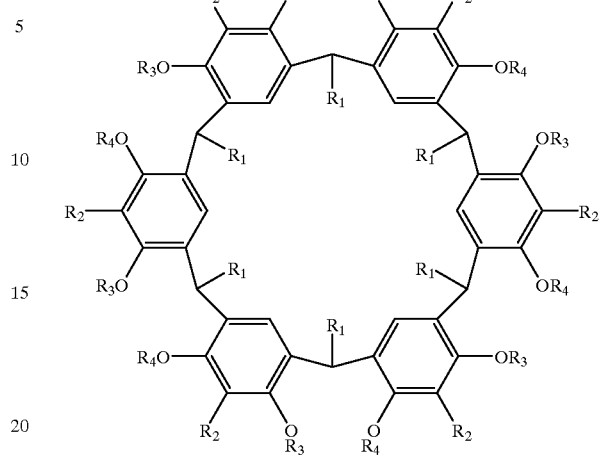

(III)

wherein $R_1$, $R_2$, $R_3$ and $R_4$ are independently hydrogen or an organic radical;

said gaseous environment being contacted with a bed of solid bodies which are impregnated or coated with at least one compound of formulae I, II or III, or washed with a liquid containing at least one of the compounds of formulae I, II or III in dissolved or dispersed state.

2. The process of claim 1, wherein at least one calixarene of formula I is used wherein R is hydrogen, alkyl, substituted alkyl, allyl, aryl, substituted aryl, hydroxy, amino, carboxy, sulfo; R' is hydrogen, alkyl, substituted alkyl, allyl, aryl, substituted aryl, acyl or —Si(CH$_3$)$_3$, and n is an integer from 1 to 5 or of formulae II or III wherein $R_1$ is substituted aryl and $R_2$, $R_3$ and $R_4$ are hydrogen.

3. The process of claim 1, wherein the capture of the VLC's is effected at ambient pressure and temperature.

4. The process of claim 1, wherein said gaseous environment is a gas stream.

5. The process of claim 1, wherein said volatile compound comprise volatile amines, mercaptans, thiols, disulfides, hydrogen sulfide or ammonia.

6. The process of claim 1, wherein the gaseous environment is an industrial exhaust.

7. The process of claim 6, wherein said industrial exhaust is an air stream issued by a waste water purification plant.

8. The process of claim 1, wherein the calixarene compound(s) having captured the VLC's are regenerated for reuse.

9. The process of claim 1, wherein said environment is contacted with said bed of solid bodies.

10. The process of claim 1, wherein said environment is washed with said liquid.

11. The process of claim 1 in which the compound is a of formula I and n is 4, 6 or 8.

12. The process of claim 1 in which the compound is of formula I, n is 1, 3 or 5 and R' is H.

13. The process of claim 1 in which the compound is p-tert-butyl calixarene.

* * * * *